United States Patent [19]
Harkness et al.

[11] Patent Number: 5,236,490
[45] Date of Patent: Aug. 17, 1993

[54] METHOD AND APPARATUS FOR MOUNTING ANCILLARY EQUIPMENT TO A FURNACE

[75] Inventors: Ian K. Harkness, Aughton; Philip E. Buckley, Preston, both of United Kingdom

[73] Assignee: Pilkington Glass Limited, St. Helens, England

[21] Appl. No.: 838,884

[22] Filed: Feb. 21, 1992

[30] Foreign Application Priority Data

Mar. 2, 1991 [GB] United Kingdom ............... 04445

[51] Int. Cl.$^5$ .................... C03B 5/16; C03B 5/42
[52] U.S. Cl. ........................ 65/171; 65/172; 65/178; 65/347; 65/DIG. 4; 373/36; 373/38; 432/76
[58] Field of Search ............... 65/171, 172, 178, 347, 65/374.13, DIG. 4; 432/76; 373/36, 38

[56] References Cited

U.S. PATENT DOCUMENTS

| | | |
|---|---|---|
| 3,015,190 | 1/1962 | Arbeit . |
| 3,391,236 | 7/1968 | Blumenfeld . |
| 3,777,040 | 12/1973 | Gell et al. . |
| 3,811,859 | 5/1974 | Ernsberger . |
| 3,938,791 | 2/1976 | Imberiti . |
| 4,215,461 | 8/1980 | Caripolti ........................ 65/171 |
| 5,151,918 | 9/1992 | Argent et al. ................... 373/36 |

FOREIGN PATENT DOCUMENTS

| | | |
|---|---|---|
| 3529365 | 2/1987 | Fed. Rep. of Germany . |
| 965134 | 9/1950 | France . |
| 1141455 | 1/1969 | United Kingdom . |
| 1326657 | 8/1973 | United Kingdom . |
| 1378279 | 12/1974 | United Kingdom . |
| 1413071 | 11/1975 | United Kingdom . |
| 2008258 | 5/1979 | United Kingdom . |
| 2149279 | 6/1985 | United Kingdom . |

Primary Examiner—Joye L. Woodard
Attorney, Agent, or Firm—Howrey & Simon

[57] ABSTRACT

A furnace has side walls and a bottom wall with a refractory lining. To permit mounting of ancillary equipment such as electrode refractory blocks are fitted to the bottom wall of the furnace. To mount each refractory block a hole is bored through the bottom wall from the exterior of the furnace with a large diameter in the outer part of the wall and a smaller diameter in the lining. The refractory block has a stepped construction to fit closely inside the bored holes. A central passageway through the refractory block has a removable plug at its inner end which may be displaced by insertion of an ancillary device such as an electrode.

11 Claims, 2 Drawing Sheets

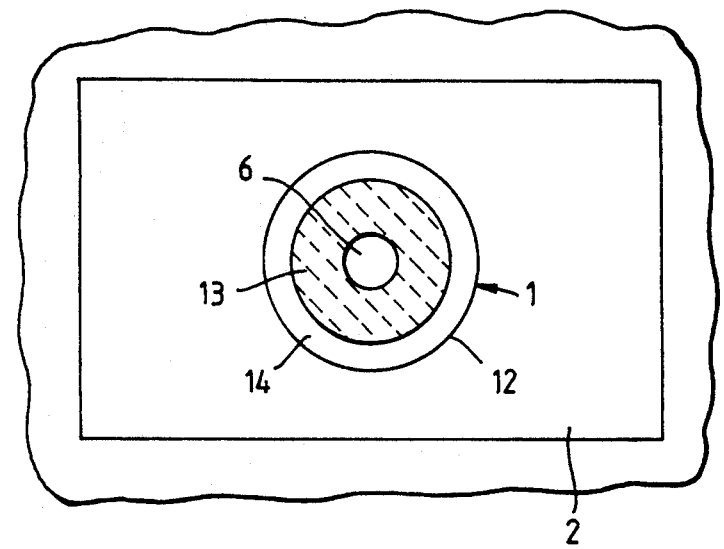
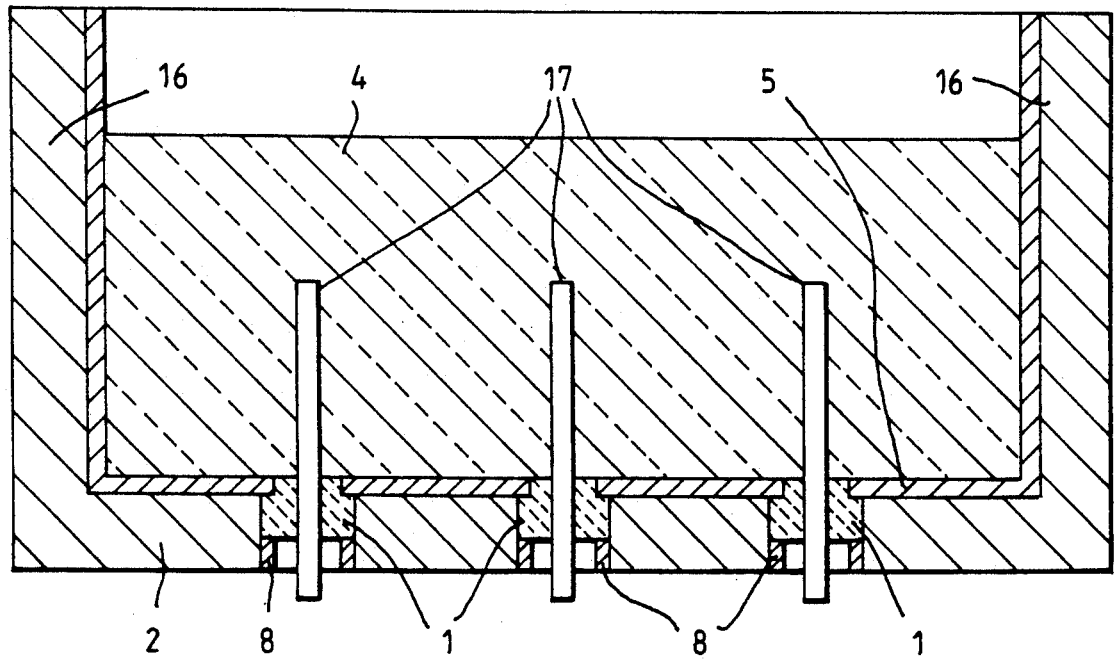

METHOD AND APPARATUS FOR MOUNTING ANCILLARY EQUIPMENT TO A FURNACE

This invention relates to a glass melting furnace and to a method and apparatus for mounting ancillary equipment to a furnace for operation within the furnace environment and in particular, to a method and apparatus for mounting ancillary equipment to the furnace from the exterior of the furnace.

BACKGROUND OF THE INVENTION

At present in the glass making industry, the mounting of refractory blocks necessary for the mounting of certain types of ancillary equipment, such as heating electrodes, has to be carried out at a cold repair. This requires taking the furnace off line and in order to effect the mounting removing the glass from the furnace at least in the vicinity of the work area. The refractory blocks can then be mounted from within the furnace.

This type of operation involves men climbing around within the furnace and working therein and there is a high probability that damage to the refractory tiles/blocks in the vicinity of the work may result, necessitating the replacement of the tiles/blocks surrounding the work area in addition to those being replaced to effect the mounting of the refractory blocks as desired.

With the conventional methods used for the mounting of ancillary equipment broadly outlined above there are distinct disadvantages, amongst which are: the costs of the refractory blocks and tiles which are intended to be replaced and of those which may require replacement as a result of damage during the procedure; and the loss of revenue whilst the plant is shut down, including furnace drain time, cool down time, repair replacement time and start-up time.

The present invention is concerned with providing a method of mounting ancillary equipment into the furnace and reducing, if not overcoming, the above mentioned problems.

SUMMARY OF THE INVENTION

In accordance with the present invention there is provided a method of mounting a refractory block member in a wall of a furnace from the exterior of the furnace, the refractory block member being adapted to receive ancillary equipment for use in the furnace environment, the method comprising forming a partial distance through the wall of the furnace from the exterior thereof a first hole of a first cross-sectional area; forming completely through the wall of the furnace from the exterior thereof, as an extension of the first hole, a second hole of smaller cross-sectional area than the first hole, thereby forming a stepped opening through the wall of the furnace; and securing in said stepped opening a block member having an inner portion adapted to fit closely with the second hole and an outer portion adapted to fit closely with the first hole.

The advantages of the present invention over the previously employed method mainly result from the fact that the mounting of the refractory blocks which enable the mounting of ancillary equipment is carried out from the exterior of the furnace, normally during a cold repair, and therefore removes the need for workmen climbing about and operating heavy machinery within the furnace. Further, as a hole is drilled through the refractory tile within the furnace in the mounting procedure, no damage is caused to the refractory tiles surrounding the drilled hole. As a consequence of this the previously mentioned problems are to a substantial degree avoided, and, therefore, it is possible to repair or upgrade furnaces at relatively low cost and quickly.

Normally, a refractory block or refractory blocks are provided in a furnace in accordance with the present invention during a standard cold shut down, for example, a cold repair.

In a preferred embodiment of the present invention the hole bored through the wall of the furnace from the exterior does not extend through the refractory lining of the furnace and a second hole of narrower diameter is bored through the refractory lining of the furnace so that its longitudinal axis is coaxial with the hole bored through the wall of the furnace.

Preferably, a single refractory block is inserted into the hole or holes bored through the furnace wall and refractory lining of the furnace, the refractory block being shaped and sized so that it forms a good surface contact with the surrounding surfaces after insertion, and is also provided with a central longitudinally extending throughbore to enable mounting of the ancillary equipment.

The throughbore provided in the refractory block is, preferably, of constant diameter.

However, alternatively the throughbore may have a stepped or tapered profile.

The mounting of ancillary equipment into the furnace is preferably achieved by inserting the ancillary equipment into the furnace by means of the throughbore in the refractory block, and connecting up the ancillary equipment.

In a preferred embodiment of the present invention the single refractory block is provided with a plug means located in the throughbore at the end of the refractory block inserted into the furnace. Therefore, the plug means comes into contact with the molten glass within the furnace during operation of the furnace, and consequently the plug means acts to prevent the flow of molten glass from the furnace by means of the throughbore when the refractory block is inserted into the bored hole/holes and prior to insertion of the ancillary equipment into the furnace environment.

In a preferred form the surfaces of the plug means which come into contact with the refractory material of the block into which the plug is inserted are diamond ground. As will be well appreciated in the industry this prevents the egress of glass between the plug means and the refractory block into which it is inserted.

Now in order to allow the insertion of a piece of ancillary equipment along the throughbore and into the furnace the plug means must be displaced into the furnace, which may be achieved by either of the following methods:

use of a special tool which is passed along the throughbore; or by means of the ancillary equipment as it is inserted into the furnace environment.

The method of mounting ancillary equipment in accordance with the present invention can be used to mount a refractory block to enable the mounting of any type of equipment which can be passed along a throughbore, for example, heating electrodes, bubblers, thermocouples etc.

It should be noted that the method of mounting ancillary equipment in accordance with the present invention can be used to mount the refractory blocks for mounting of ancillary equipment in any wall of the furnace.

In accordance with a second aspect of the present invention, there is provided a refractory block member for mounting in a wall of a furnace from the exterior thereof, said block being adapted to receive ancillary equipment for use in the furnace environment, said block having an outer portion of circular cross-section adapted to fit a first hole bored a partial distance through the wall of the furnace from the exterior thereof; an inner portion of circular cross-section coaxial with the outer portion and of smaller diameter than the outer portion, said inner portion being adapted to fit a second hole bored completely through the wall of the furnace from the exterior thereof, a passageway entirely through both the outer and inner portions, and a removable plug member for mounting in said passageway at an inner end of the outer portion.

In use, to enable ancillary equipment to be deployed into the furnace environment via the throughbore of a refractory block in situ it is necessary to displace the plug means so as to enable the passage of the equipment. As mentioned above the plug means may be displaced by means of a special tool or alternatively by deployment of the ancillary equipment.

The invention also provides a furnace having side and bottom walls formed of refractory material characterised by: a first hole of a first cross-sectional area formed a partial distance through a wall of the furnace from the exterior thereof; a second hole of a smaller cross-sectional area than the first hole formed completely through the wall of the furnace from the exterior thereof, as a co-axial extension of the first hole, the first and second hole together comprising a stepped opening through the walls of the furnace; a refractory block member having a longitudinal bore entirely through the block member adapted to receive ancillary equipment for use in the furnace environment, said block member having an inner portion fitted closely with the second hole and an outer portion fitted closely with the first hole, and a removable plug member for fitting said longitudinal bore against an inner end of the inner portion.

BRIEF DESCRIPTION OF THE DRAWINGS

FIG. 3 shows a diagrammatic cross-section along the line X—X' of the part of the furnace with the refractory block as shown in FIGS. 1 and 2 of the drawings, and FIG. 4 is a section through a glass melting furnace in accordance with the present invention.

DESCRIPTION OF THE PREFERRED EMBODIMENT

Figure 1:
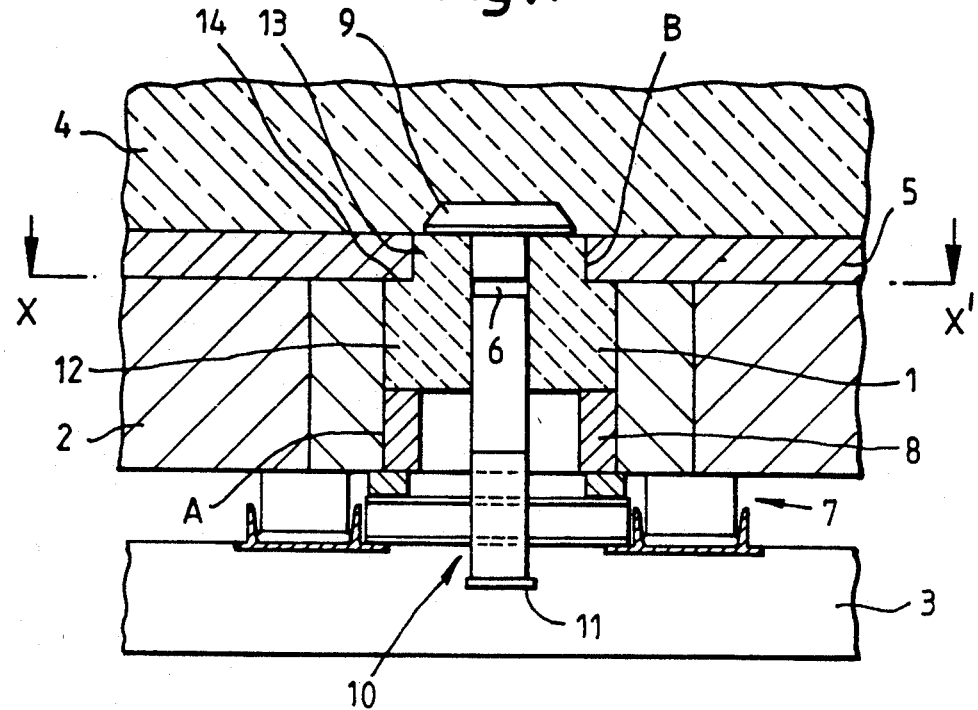
FIG. 1 shows a diagrammatic side cross-section of a part of a glass furnace having a refractory block mounted in accordance with the present invention.
Figure 2:
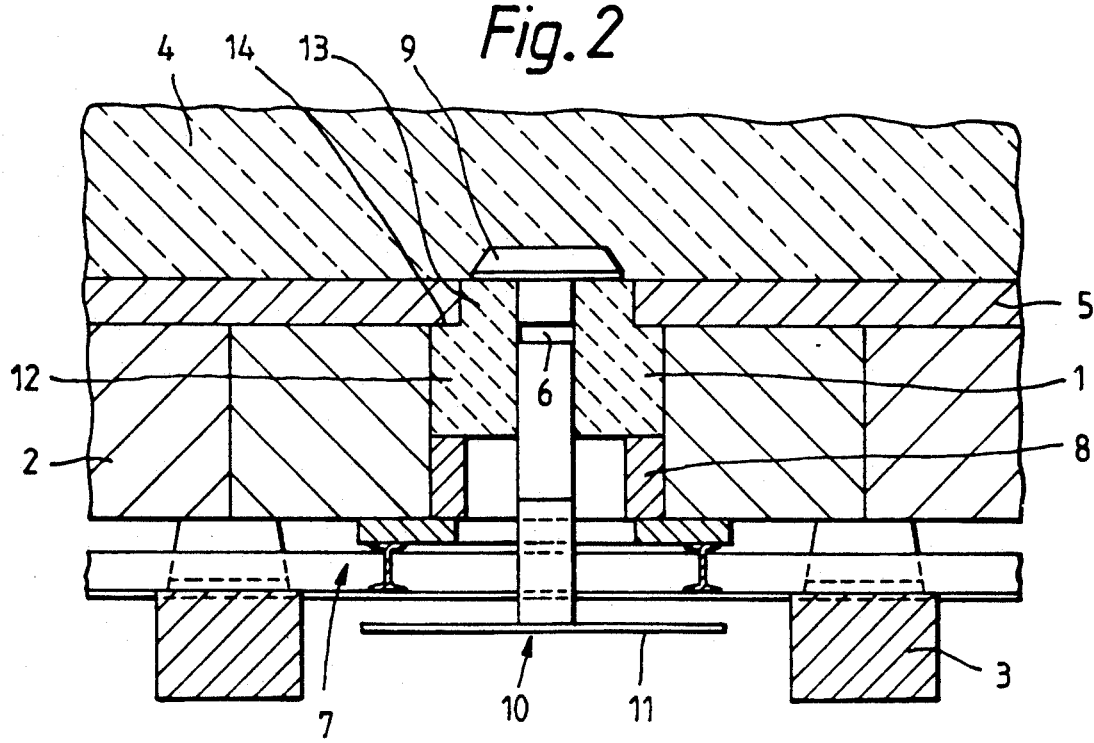
FIG. 2 shows a diagrammatic end cross-section of the part of the furnace with the refractory block as shown in FIG. 1 of the drawings.

Now referring to FIGS. 1 to 2 of the accompanying drawing there is shown a refractory block 1 mounted into the bottom wall 2 of a glass making furnace which is mounted upon a lattice network of supporting beams 3.

The furnace contains a volume 4 of molten glass, which is normally at a temperature in the region of 1000° to 1350° C. Consequently all the surfaces of the furnace exposed to the molten glass environment are provided with a layer or lining 5 of refractory material, for example fused cast Alumina-Zirconia-Silica.

The refractory block 1 is located in a hole which is bored through the bottom wall 2 of the glass making furnace, and a second coaxial hole bored through the refractory lining, which is of narrower diameter than the hole bored in the bottom wall 2 and is coaxial therewith.

The refractory block 1 is shaped and sized so that it forms a good contact with the surfaces of the bottom wall 2 and the refractory lining which surround the refractory block 1. Also the refractory block is provided with a central longitudinally extending axial throughbore 6 of constant diameter.

Consequently, the refractory block 1 is of tubular construction having a main section 12 of a diameter substantially the same as that of the bored hole in the wall of the furnace into which it is located and a second section 13 of a diameter substantially the same as that of the bored hole in the refractory lining. Now as a result of the difference in external diameters between the main section 12 and the second section 13 of the refractory block 1 a shelf 14 is formed in the refractory block.

A plug means 9 is located in one end of the throughbore 6 of the refractory block 1 in order to prevent the passage of molten glass along the throughbore 6 to the outside environment during the period prior to insertion of the ancillary equipment, for example an electrode heating device, into the furnace by means of the throughbore 6.

Once located in the bored holes the refractory block 1 is secured in position by means of a support ring 8 and a supporting construction 7 which holds the support ring 8 and thereby the refractory block 1 in position.

Finally, a keeper 10 including a bar 11 normally connected to the lattice work 3 to mount the keeper in position, and an end section formed from refractory material, is inserted into the throughbore 6 from the exterior to further ensure that molten glass does not pass down the throughbore 6 prior to the insertion of ancillary equipment.

In order to mount a piece of ancillary equipment into the furnace by means of the throughbore in a located refractory block 1, the following procedure is adopted:

The keeper 10 is moved from the throughbore 6;

the ancillary equipment, for example the electrode of the electrode heating means, is inserted into the throughbore 6;

The ancillary equipment is pushed along the throughbore 6 and into the molten glass within the glass making furnace; on its passage the ancillary equipment dislodges the plug 9 from its position; and the ancillary equipment is secured into position and is connected up for operation.

The refractory block 1 is located into the wall of a furnace using the following procedure:

a first hole A is bored through the appropriate wall of the furnace but does not extend through the refractory lining of the furnace;

a second hole B of narrower diameter is now bored, so that it is coaxial with the first hole A, through the refractory lining of the furnace;

a refractory block 1 with the plug means 9 in position in the throughbore 6 is inserted into the first hole A and pushed into position with the main section 12 thereof located in the first hole A and the second section 13 located in the second hole B so that the shelf 14 abuts against the refractory lining of the furnace;

the support ring 8 is inserted into the hole A so that it abuts the base of the refractory block 1;

the support ring 8 and thereby the refractory block 1 are now secured into position using the supporting construction 7; and the keeper 10, or the ancillary equipment, is now located into the throughbore 6 awaiting insertion of the ancillary equipment into the furnace environment.

FIG. 4 shows a glass melting furnace with side walls 15 having a refractory lining and a row of vertically extending electrodes 17 each fitted through the throughbore 6 of a respective refractory block 1 in the bottom wall 2 of the furnace.

The invention has been illustrated above by means of an example in which the ancillary equipment has been mounted into the furnace through the bottom wall. However, it will be well appreciated by those skilled in the art that the method of mounting ancillary equipment in accordance with the present invention is not limited to mounting through the bottom wall and may be used with respect to any one of the walls of the furnace. In alternative embodiments, the throughbore 6 may be stepped or tapered.

We claim:

1. A method of mounting a refractory block member in a wall of a furnace from the exterior of the furnace, the refractory block member being adapted to receive ancillary equipment for use in the furnace environment, the method comprising forming a partial distance through the wall of the furnace from the exterior thereof a first hole of a first cross-sectional area; forming completely through the wall of the furnace from the exterior thereof, as an extension of the first hole, a second hole of smaller cross-sectional area than the first hole, thereby forming a stepped opening through the wall of the furnace; and securing in said stepped opening a block member having an inner portion adapted to fit closely with the second hole, an outer portion adapted to fit closely with the first hole, and a longitudinally extending throughbore, a displaceable plug located at an inner end of the throughbore, the plug being displaceable from the inner end of the throughbore by inserting a piece of ancillary equipment therein from an outer end of the outer portion.

2. A method as claimed in claim 1, wherein the first hole and the second hole are each circular in cross-section and coaxial with each other, and said inner and outer portions of said block member are of circular cross-section and of diameters which fit closely within said first and second holes respectively.

3. A method as claimed in claim 2, in which the wall of the furnace comprises an outer layer and an inner refractory layer, the first hole being formed entirely within the outer layer and the second hole being formed through the inner refractory layer.

4. A method as claimed in claim 1, wherein the block member comprises a unitary block with a step adjacent a junction of the inner and outer portions, and the step of the block member abuts against the step in the opening.

5. A method as claimed in claim 1, further comprising mounting a piece of ancillary equipment in the throughbore by inserting a piece of ancillary equipment therein and displacing the plug from the throughbore;

6. A refractory block member for mounting in a wall of a furnace from the exterior thereof and for receiving ancillary equipment for use in the furnace environment, said block member comprising an outer portion of circular cross-section adapted to a fit a first hole bored a partial distance through the wall of the furnace from the exterior thereof; an inner portion of circular cross-section coaxial with the outer portion and of smaller diameter than the outer portion, said inner portion being adapted to fit a second hole bored completely through the wall of the furnace from the exterior thereof, a passageway entirely through both the outer and inner portions, and a removable plug member for mounting in said passageway at an inner end of the inner portion, said plug member, including a shaft member for location in said passageway and a cap member attached to the shaft member for abutment against an inner face of the inner portion to prevent movement of the plug member towards the outer portion, the plug member being slidable in the passageway so that the plug member may be displaced by insertion of an ancillary device through the passageway of the refractory block.

7. A block member as claimed in claim 6, in which the passageway extends centrally through the block member and is of constant diameter along its length.

8. A furnace having side and bottom walls formed of refractory material, a first hole of a first cross-sectional area formed a partial distance through one of said walls of the furnace from the exterior thereof; a second hole of a smaller cross-sectional area than the first hole formed completely through said one wall of the furnace from the exterior thereof, as a co-axial extension of the first hole, the first and second hole together comprising at stepped opening through the wall of the furnace; a refractory block member having a longitudinal bore entirely through the block member adapted to receive ancillary equipment for use in the furance environment, said block member having an inner portion fitted closely with the second hole and an outer portion fitted closely with the first hole, and a removable plug member for fitting in said longitudinal bore against an inner end of the inner portion, said plug member including a shaft member for location in said passageway and a cap member attached to the shaft member for abutment against an inner face of the inner portion to prevent movement of the plug member towards the outer portion, the plug member being slidable in the passageway so that the plug member may be displaced by insertion of an ancillary device through the passageway of the refractory block.

9. A furnace as claimed in claim 8, in which said one wall comprises an outer layer and an inner refractory layer, said first hole being formed in the outer layer and said second hole extending through the inner refractory layer.

10. A furance as claimed in claim 8, in which the inner portion and the outer portion of the block member together form a unitary stepped block.

11. A furnace as claimed in claim 8 in which the first hole and the second hole are each circular in cross-section and in which the first and second hole are each bored into a bottom wall of the furnace from the exterior thereof so that the block member extends upwardly with said inner portion above said outer portion.

* * * * *